(12) United States Patent  
Huang et al.

(10) Patent No.: US 8,824,098 B1
(45) Date of Patent: Sep. 2, 2014

(54) BELLEVILLE DISK CLAMP

(75) Inventors: Lidu Huang, Danville, CA (US); Victor W. Santini, Mountain View, CA (US); Chen-Chi Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 2314 days.

(21) Appl. No.: 11/523,184

(22) Filed: Sep. 19, 2006

(51) Int. Cl.
*G11B 17/02* (2006.01)

(52) U.S. Cl.
USPC ...................................... 360/99.12

(58) Field of Classification Search
USPC ...................................... 360/99.12
See application file for complete search history.

(56) References Cited

U.S. PATENT DOCUMENTS

| | | |
|---|---|---|
| 5,274,517 A | 12/1993 | Chen |
| 5,490,024 A | 2/1996 | Briggs et al. |
| 5,790,346 A * | 8/1998 | Fletcher ............ 360/99.12 |
| 6,028,739 A | 2/2000 | Lindrose |
| 6,417,988 B1 * | 7/2002 | Renken et al. ........ 360/99.12 |
| 6,483,661 B1 | 11/2002 | Martin et al. |
| 6,542,330 B1 | 4/2003 | Choo et al. |
| 6,549,367 B1 | 4/2003 | Joshi et al. |
| 6,961,215 B2 | 11/2005 | Hashizume et al. |
| 6,967,814 B1 | 11/2005 | Chessman et al. |
| 2004/0012882 A1 | 1/2004 | Kim et al. |
| 2005/0185330 A1 | 8/2005 | Lee et al. |

FOREIGN PATENT DOCUMENTS

JP         08-063871         3/1996

OTHER PUBLICATIONS

"Encyclopedia of Spring Design", Spring Manufacturers Institute, pp. RR-15 to RR-20, 2000.

* cited by examiner

*Primary Examiner* — Mark Blouin

(57) ABSTRACT

A disk clamp for clamping an information storage disk to a rotating spindle in a disk drive includes a deflection portion that is annular and conical in shape, and which has a material thickness, an outer extent, and an inner extent. In certain embodiments, the inner extent is offset from the outer extent by a particular height measured parallel to an axis of rotation of the disk clamp. The disk clamp may further include a disk contact portion that is disposed radially outboard from the deflection portion, and which may include a curvature radially outboard of the outer extent that departs from a projection of the deflection portion, and a surface for contacting the information storage disk.

15 Claims, 8 Drawing Sheets

BELLEVILLE DISK CLAMP

FIELD OF THE INVENTION

The invention relates in general to data storage systems such as disk drives, and in particular to a disk clamp to secure an information storage disk to a rotating spindle in a disk drive.

BACKGROUND OF THE INVENTION

Disk drives typically store data on one or more information storage disks. Disk clamps are used to secure such information storage disks to a spindle hub that rotates about a spindle.

Variation within a population of disk drives of the clamping force applied to the disk by the clamp is undesirable at least because it can lead to part-to-part variation in disk surface curvature and/or clamp yielding or disk slippage during mechanical shocks. Any of these problems might later interfere with retrieving data form the disk.

FIG. 1A illustrates a disk clamp 100 of the prior art in which an inner extent 110 of the clamp 100 is oriented lower the point 120 (see FIG. 1C), which represents the point along the clamp 100 where the substantially straight extent of its cross-section ends and cross-sectional curves providing stiffness around its disk contact portion begin. Installation of the clamp 100 will cause deflection of the clamp 100 and exert a force on the disk surface against which it is being installed. The amount of force exerted by this prior art clamp is linearly proportional to the amount of clamp deflection, as shown in FIG. 1B.

The clamping force typically depends upon the deflection of the clamp by a fastener, which, in turn, typically depends upon how much the fastener is tightened during disk drive assembly/installation. However, there can be much variation in how much the fastener is tightened during installation. Therefore, there is a need in the art to render the disk clamping force to be less sensitive to clamp deflection.

SUMMARY OF THE INVENTION

A disk clamp for clamping an information storage disk to a rotating spindle using a fastener in a disk drive is disclosed and claimed herein. In certain embodiments, the disk clamp includes a deflection portion that is annular and conical in shape, having a substantially straight cross section, along with a material thickness, an outer extent and an inner extent. The inner extent is offset from the outer extent by a height measured parallel to an axis of rotation of the disk clamp, the height being in the range 2 to 2.6 times the material thickness. The inner extent further comprises an inner edge disposed at an inner radius of the disk clamp, the inner edge being fashioned to be coupled to the fastener with the fastener extending radially closer to the axis of rotation than the inner edge. The disk clamp further includes a disk contact portion that is disposed radially outboard from the deflection portion, and which includes a curvature radially outboard of the outer extent that departs from a projection of the deflection portion, and a bottom surface for contacting the information storage disk.

Other aspects, features, and techniques of the invention will be apparent to one skilled in the relevant art in view of the following detailed description of the exemplary embodiments.

DETAILED DESCRIPTION OF THE EXEMPLARY EMBODIMENTS

Figure 1A:
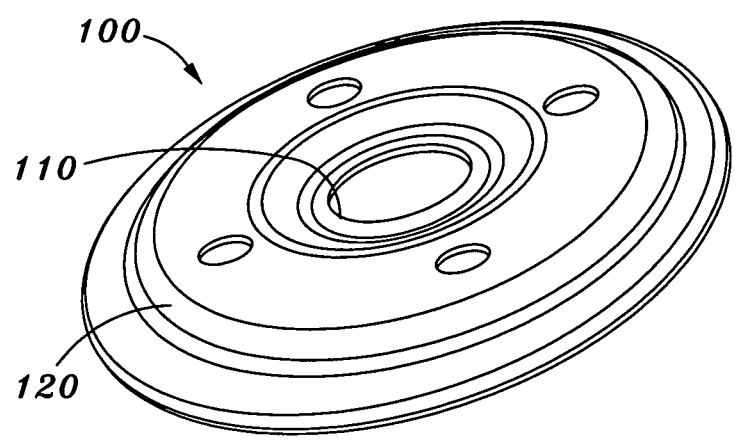
FIG. 1A depicts a disk clamp of the prior art.
Figure 1C:
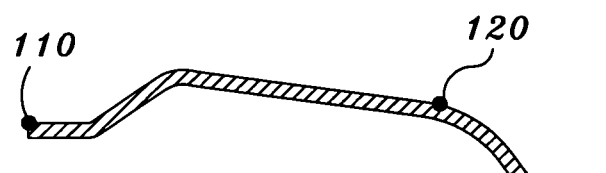
FIG. 1C depicts a cross section view of the disk clamp of FIG. 1A.
Figure 1B:
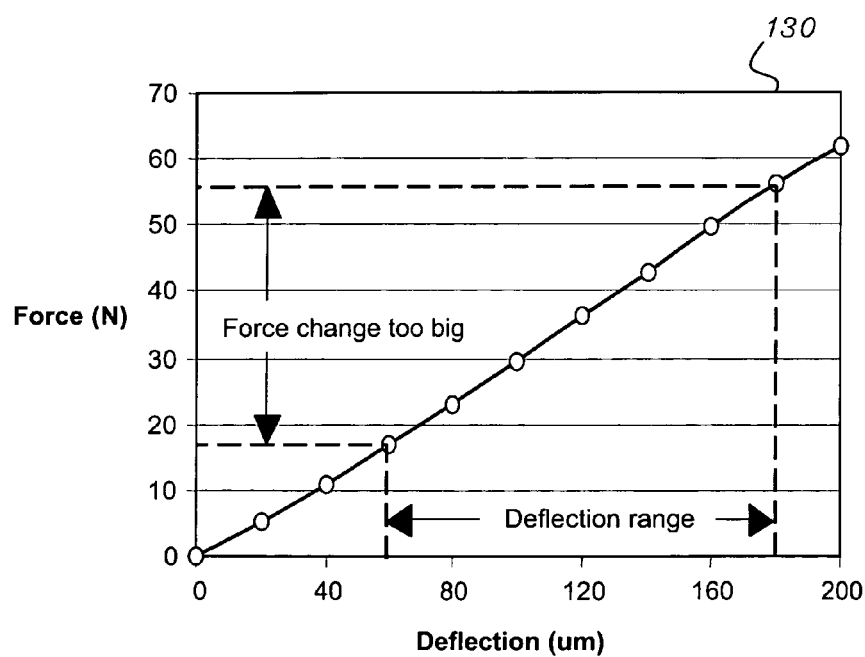
FIG. 1B depicts a graph of the force exerted by the clamp of FIG. 1A on a surface of an information storage disk versus how much the clamp is deflected by a fastener.

One aspect of the invention is to provide a disk clamp to clamp an information storage disk to a rotating spindle using a fastener. In certain embodiments, the disk clamp includes a deflection portion that is annular and conical in shape, having a substantially straight cross section, and which has an outer extent and an inner extent, where the inner extent is offset from the outer extent by a height measured parallel to an axis of rotation of the disk clamp. In certain embodiments, this height is in the range 2 to 2.6 times a material thickness of the disk clamp. The inner extent may further include an inner edge disposed at an inner radius of the disk clamp, where the inner edge is fashioned to be coupled to the fastener. In certain embodiments, the fastener extends radially closer to the axis of rotation than the inner edge. It should be appreciated that the fastener may be any of a screw, a locking ring, a rivet, an adhesive, or a heat-shrink retaining ring. In certain embodiments, insertion or tightening of the fastener causes deflection of the clamp. In certain other embodiments, the fastener is applied after or while something else (e.g. a tool) causes deflection of the clamp (so that the fastener merely maintains that deflection).

Additionally, the disk clamp further includes a disk contact portion that is disposed radially outboard from the deflection portion, and which includes a curvature radially outboard of the outer extent that departs from a projection of the deflection portion. In certain embodiments, this curvature is concave in shape and has a radius of curvature no greater than 10 mm. A bottom surface of the disk contact portion is usable for contacting the information storage disk.

Another aspect of the invention is to provide a disk clamp that has a substantially cylindrical lip disposed at an inner edge, where the lip has a thickness that is greater than the material thickness of the clamp itself.

Still another aspect of the invention is to provide a disk clamp which exerts a force on an information storage disk that is nonlinearly related to a deflection of the disk clamp such that a spring rate of the disk clamp decreases with increasing deflection of the disk clamp. In certain embodiments, the force exerted by the clamp depends upon the amount of deflection in a way that is characteristic of a Belleville spring.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to FIGS. 2A-2E, depicted is a disk clamp 200 designed in accordance with an embodiment of the invention. While the disk clamp 200 may be constructed of numerous types of materials, in some embodiments the disk clamp may comprise aluminum, stainless steel, titanium and/or plastic. As shown, an inner extent 210 is offset from an outer extent 220 by a height (h) measured parallel to an axis of rotation of the disk clamp. The inner extent 210 is disposed at an inner radius of the disk clamp 200, creating an inner edge to which a fastener (not shown) may be coupled to secure the disk clamp 200. In certain embodiments, such a fastener may extend radially closer to the axis of rotation than the inner extent 210.

Disk clamp 200 further includes a deflection portion 215 that is substantially annular and conical in shape, and which has a substantially straight cross section. In certain embodiments, the deflection portion 215 may be defined by the segment extending between the inner extent 210 and the outer extent 220, where the outer extent 220 represents the point where one or more cross-sectional curves providing stiffness for purposes of contacting a disk surface begin. It should be appreciated that while some deflection may occur outboard of outer extent 220 during installation of the clamp, the majority of such deflection in this embodiment will occur along the deflection portion 215.

FIGS. 2B-2E further depict a disk contact portion 240 that is disposed radially outboard from the outer extent 220. In certain embodiment, the disk contact portion 240 includes one or more cross-sectional curves providing a degree of stiffness to the clamp 200. Thus, the outer extent 220 represents the point along the disk clamp 200 where the substantially straight defection portion 215 ends and where the curvature(s) associated with the disk contact portion 240 begin. As shown, the disk contact portion 240 further includes a bottom surface 230 for contacting the information storage disk.

Figure 2A:
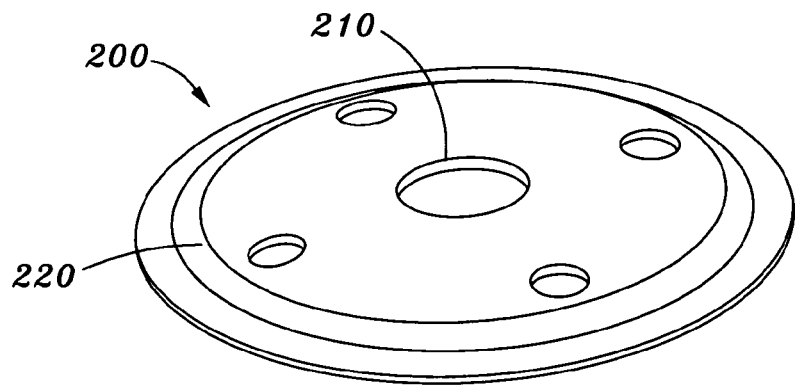
FIG. 2A depicts a perspective view of a disk clamp in accordance with an embodiment of the invention.
Figure 2B:
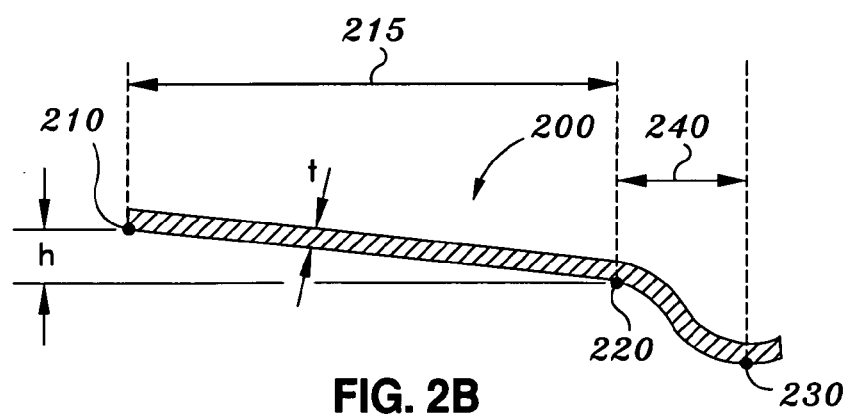
FIGS. 2B-2E depict cross sectional views of various embodiments of the disk clamp of FIG. 2A.
Figure 2C:
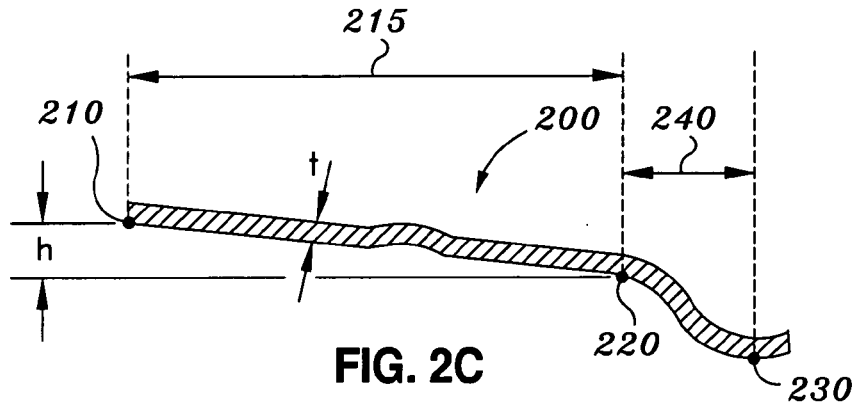
Figure 2D:
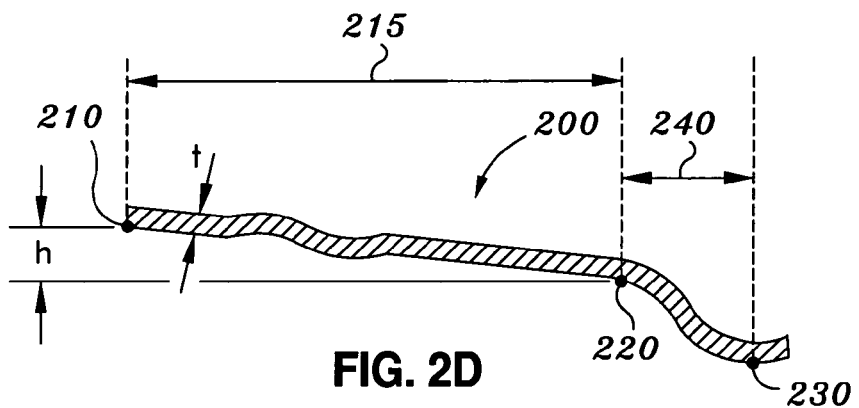
Figure 2E:
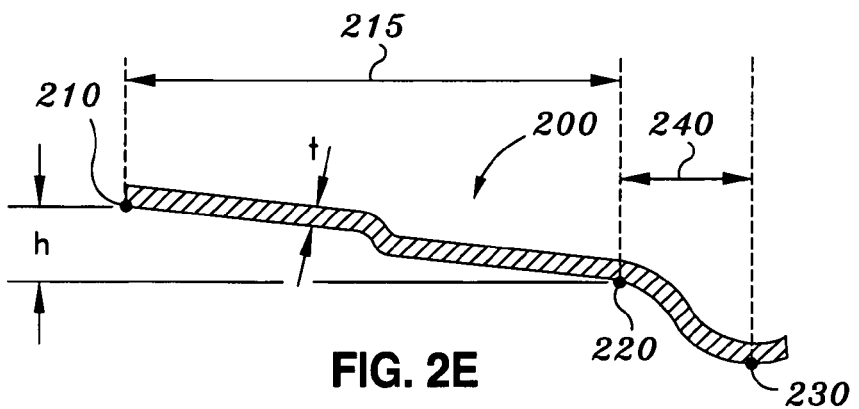

It should further be appreciated that the substantially straight deflection portion 215 may be perfectly linear, as shown in FIG. 2B, or may have one or more insubstantial nonlinearities, as shown in FIGS. 2C-2E.

It should be appreciated that a disk clamp like disk clamp 200 may be usable with any disk drive form factor, including for example 1-inch drives, 1.8-inch drives, 2.5-inch drives and 3.5-inch drives. Depending on the size of the drive, the material thickness (t) of clamp 200 may vary. By way of example, in the case of 1-inch drives, the clamp's thickness (t) may be in the range of about 0.08 mm to about 0.12 mm. In the case of 1.8-inch drives, the clamp thickness (t) may be in the range of about 0.15 mm to about 0.25 mm. Similarly, the clamp thickness (t) may be between about 0.3 mm to about 0.4 mm for 2.5-inch drives, while 3.5-inch drives may have a clamp thickness (t) of between about 0.6 mm to about 0.8 mm.

The force exerted by the exemplary disk clamp 200 on an information storage disk is nonlinearly related to the deflection of the disk clamp 200. This may be due to a Belleville spring effect in which the spring rate of the disk clamp 200 decreases with increasing deflection of the disk clamp 200. This Belleville spring effect may be facilitated by the inner extent 210 being oriented higher than the outer extent 220 (as shown in FIGS. 2B-2E), and/or by the height (h) being in the range of between 2 to 2.6 times the material thickness (t).

Figure 3:
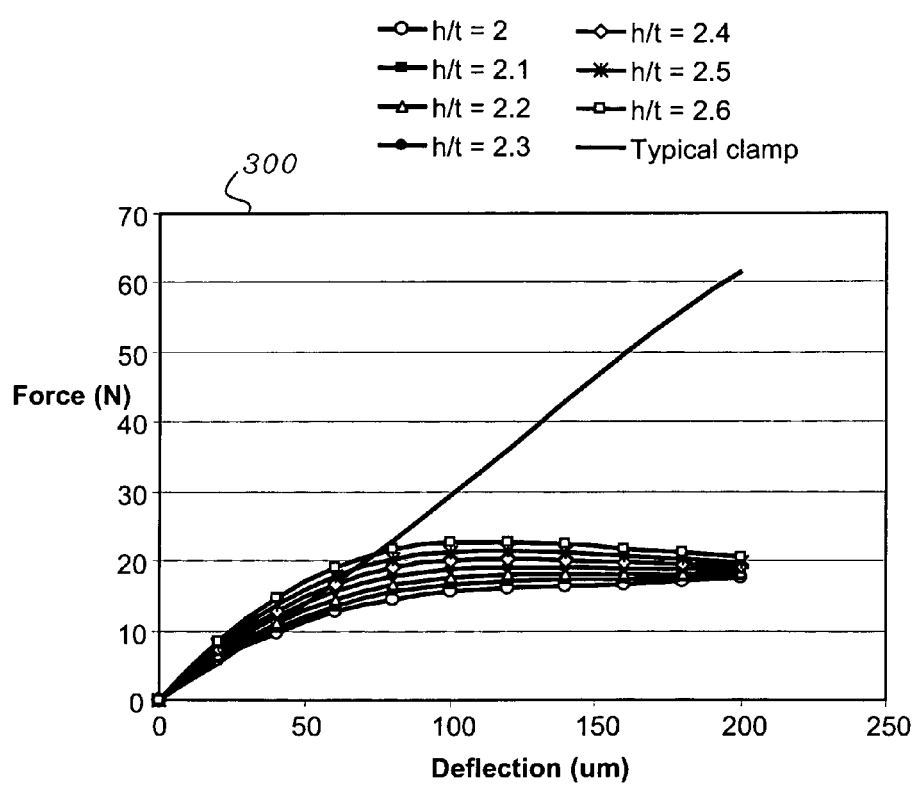
FIG. 3 depicts a graph of the force exerted by the clamp of FIGS. 2A-2B on a surface of an information storage disk versus how much the clamp is deflected by a fastener.

Referring now to FIG. 3, depicted is a graph 300 plotting clamping force (N) versus the amount of deflection (μm) experienced by a disk clamp during installation. There is a non-linear relationship between force and deflection, with clamping force becoming less sensitive to deflection as deflection increases (because the effective spring rate is decreasing). It should of course be appreciated that the amount of force deflection plotted in graph 300 are provided for exemplary purposes only, and other embodiments, drive sizes and/or clamp thicknesses may yield different amounts of clamp force and/or deflection. For example, a clamp having a thickness of between about 0.08 mm and 0.12 mm, such as clamps used in a 1-inch drives, may experience deflection between about 60 μm and 180 μm. Similarly, for a clamp thickness between about 0.15 mm and 0.25 mm (e.g., used in a 1.8-inch drive), the amount of disk clamp deflection may be between about 140 μm and 280 μm. Clamps with a thicknesses of between about 0.3 mm and 0.4 mm (e.g., used in a 2.5-inch drive) may deflect between about 250 μm and 450 μm, while clamps with a thicknesses of between about 0.6 mm and 0.8 mm (e.g., used in a 3.5-inch drive) may deflect between about 500 μm and 900 μm.

Figure 4A:
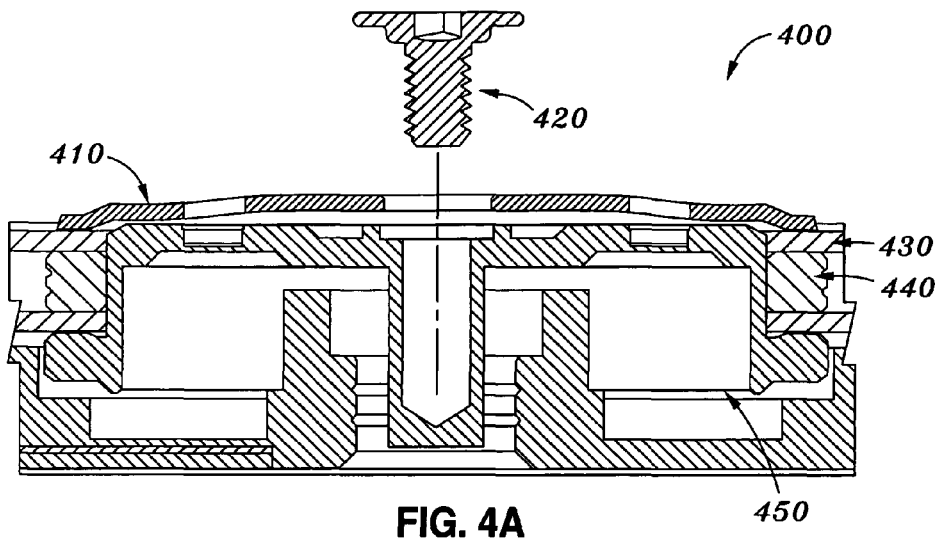
FIGS. 4A-4B illustrate cross section views of a disk drive having a disk clamp in accordance with an embodiment of the invention.
Figure 4B:
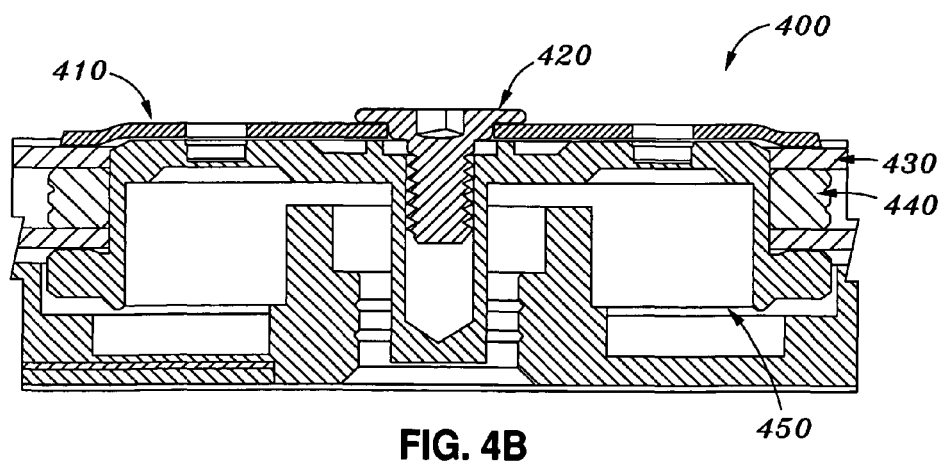

FIGS. 4A and 4B depict cross sectional views of a disk drive 400 just before and after installation of a disk clamp 410, respectively. FIG. 4A shows an embodiment of the disk clamp 410 as it is prepared to be installed in the disk drive 400. As shown, a fastener 420 is in position to secure the disk clamp 410 to the spindle hub 450, thereby securing the information storage disk 430 to the spindle hub 450. While in the embodiment of FIGS. 4A-4B fastener 420 is shown as being a screw, the fastener 420 may also be a locking ring, a rivet, an adhesive, a heat-shrink retaining ring, etc. Information storage disk 430 may be separated from one or more additional disks using a disk spacer 440, for example.

FIG. 4B depicts the disk clamp 400 of FIG. 4A after it has been secured to the spindle hub 450 by the fastener 420. As shown, in the installed position the disk clamp 410 may undergo an amount of deflection until it is substantially flat against the information storage disk 430 that it to secure.

Figure 5:
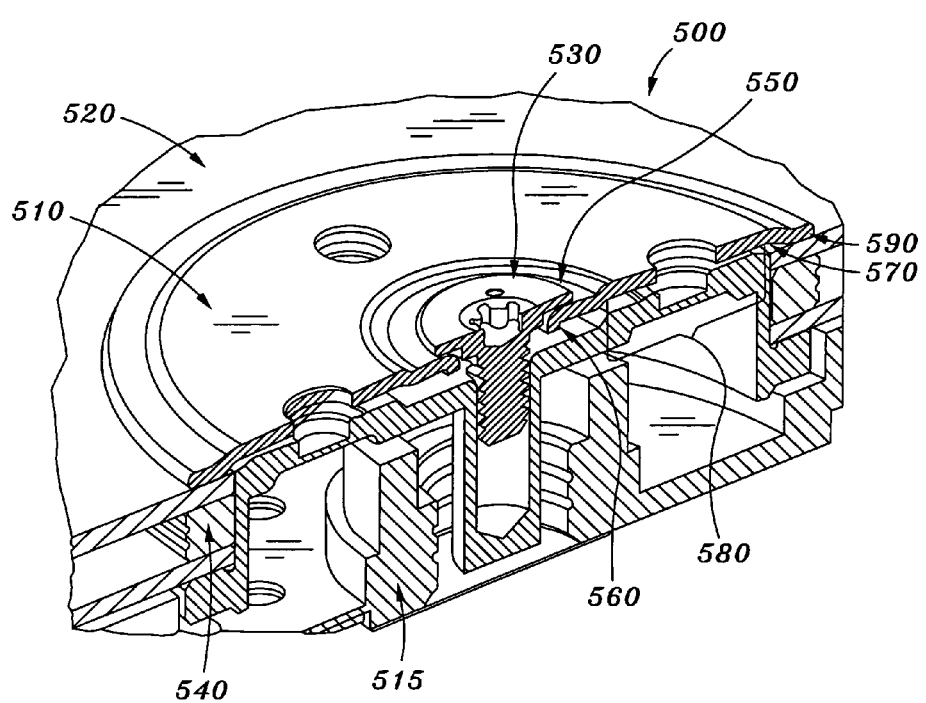
FIG. 5 is a cross section view of a disk drive having a disk clamp in accordance with another embodiment of the invention.

Referring now to FIG. 5, depicted is another embodiment of a disk drive 500 in which a disk clamp 510 has been secured to a spindle hub 515 of the disk drive 500 using a fastener 530. As shown, the disk clamp 510 is fastened with fastener 530 to secure an information storage disk 520. While in certain embodiments, the disk drive 500 may comprise only a single information storage disk 520, in certain other embodiments multiple information storage disks separated by spacers 540 may be equally secured using the clamp 510.

In the embodiment of FIG. 5, the disk clamp 510 includes a lip 560 disposed at an inner radius of the disk clamp. In certain embodiments, the lip 560 is substantially cylindrical in shape, and may have a thickness that is greater than a thickness of the rest of the clamp 510. Moreover, the lip 560 is depicted as being in contact with the fastener 530, where the fastener 530 extends radially closer to the axis of rotation for the disk clamp 510 than does the lip 560. In certain embodiments, the lip 560 will extend radially closer to the axis of rotation than an edge 550 of fastener 530, as shown in FIG. 5.

As also shown in FIG. 5, the disk clamp 510 includes a deflection portion 580 that extends between the inner extent (i.e., lip 560 in this embodiment) and an outer extent 570. In certain embodiments, the majority of the deflection experienced by the clamp 510 will occur across the deflection portion 580. While in the embodiment of FIG. 5, the lip 560 is depicted as being located at the inner radius of the disk clamp, in other embodiments the lip 560 may be disposed anywhere inboard of the deflection portion 580.

FIG. 5 further depicts a disk contact portion 590 disposed radially outboard from the outer extent 570. In certain embodiments, the boundary between the outer extent 570 and the disk contact portion 590 is a point of curvature that departs from the projection of the deflection portion 580.

Figure 6A:
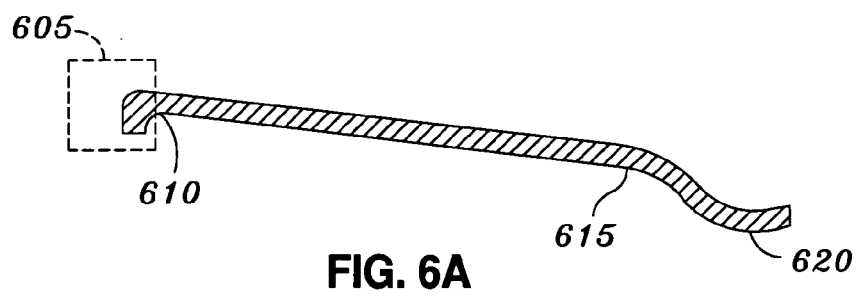
FIGS. 6A-6C are cross section view of disk clamps in accordance with one or more embodiments of the invention.
Figure 6B:
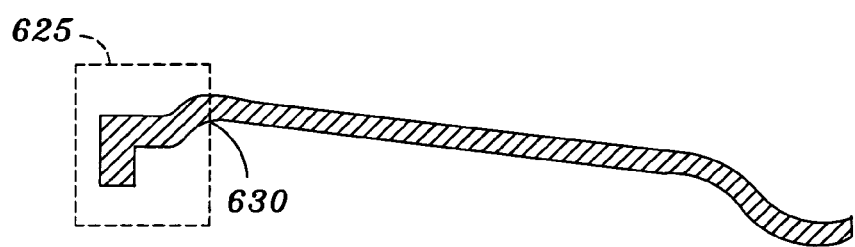
Figure 6C:
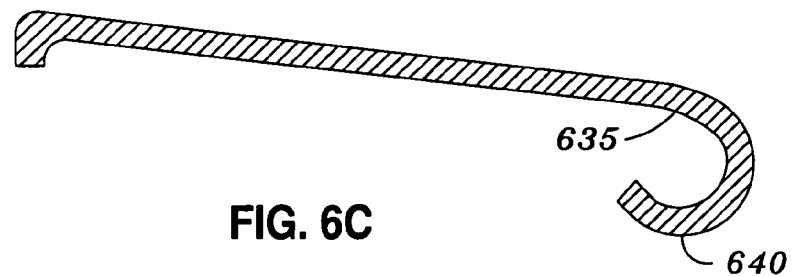

FIGS. 6A-6C depict cross section views of one or more embodiments of disk clamps having a lip disposed radially inboard of an inner extent and a disk contact portion disposed radially outboard from an outer extent. In the embodiment of FIG. 6A, for example, the disk clamp includes a lip 605 inboard of an inner extent 610, which is disposed at an inner radius of the disk clamp. In certain embodiments, the lip 605 is fashioned to be coupled to a fastener that extends radially closer to an axis of rotation of the clamp than the lip 605. The clamp of FIG. 6A further includes a disk contact portion disposed radially outboard of a curvature 615. In certain embodiments, the segment of the clamp extending between the inner extent 610 and the curvature 615 will experience the majority of deflection.

FIG. 6A further depicts the disk contact portion as including surface 620 for contacting the information storage disk. The curvature 615 is characterized by a concave shape, which in certain embodiments has a radius of curvature of no greater than 10 mm. Similarly, in order to create a surface (e.g., surface 620) suitable for contacting the information storage disk, the disk contact portion may also include a second curvature radially outboard from curvature 615, which may have a convex shape with a radius of curvature of no greater than 10 mm.

FIG. 6B depicts the disk clamp of FIG. 6A in which another embodiment of a lip 625 is shown as being inboard of an inner extent 630. In addition, FIG. 6C depicts the disk clamp of FIG. 6A having another embodiment of a disk contact portion. In this embodiment, the disk contact portion begins at curvature 635 and includes contact surface 640 for contacting the information storage disk. As shown, curvature 635 is characterized by a concave shape, which in certain embodiments has a radius of curvature of no greater than 10 mm.

While the invention has been described in connection with various embodiments, it will be understood that the invention is capable of further modifications. This application is intended to cover any variations, uses or adaptations of the invention following, in general, the principles of the invention, and including such departures from the present disclosure within the known and customary practice in the art to which the invention pertains.

What is claimed is:

1. A disk clamp for clamping an information storage disk to a rotating spindle using a fastener in a disk drive, the disk clamp comprising:
   a deflection portion that is annular and conical in shape and having a substantially straight cross section, the deflection portion having
      a material thickness,
      an outer extent, and
      an inner extent that is offset from the outer extent by a height measured parallel to an axis of rotation of the disk clamp, the height being in the range 2 to 2.6 times the material thickness, wherein the inner extent further comprises an inner edge disposed at an inner radius of the disk clamp, the inner edge being fashioned to be coupled to the fastener with the fastener extending radially closer to the axis of rotation than the inner edge, the inner edge having a substantially cylindrical lip that has a lip thickness that is greater than the material thickness; and
   a disk contact portion that is disposed radially outboard from the deflection portion, the disk contact portion including
      a first curvature radially outboard of the outer extent that departs from a projection of the deflection portion, the first curvature being characterized by a concave shape with a radius of curvature no greater than 10 mm, and
      a bottom surface for contacting the information storage disk, wherein the height is measured from the outer extent and away from the bottom surface.

2. The disk clamp of claim 1, wherein the disk clamp comprises a material selected from a list consisting of aluminum, stainless steel, titanium and plastic.

3. The disk clamp of claim 1, wherein the fastener is selected from a list consisting of a screw, a locking ring, a rivet, an adhesive, and a heat-shrink retaining ring.

4. The disk clamp of claim 1, wherein the material thickness is in the range of about 0.08 mm to about 0.12 mm.

5. The disk clamp of claim 1, wherein the material thickness is in the range of about 0.15 mm to about 0.25 mm.

6. The disk clamp of claim 1, wherein the material thickness is in the range of about 0.3 mm to about 0.4 mm.

7. The disk clamp of claim 1, wherein the material thickness is in the range of about 0.6 mm to about 0.8 mm.

8. The disk clamp of claim 1, wherein the deflection portion is fashioned to deflect between about 60 μm and 180 μm when secured in an installed position.

9. The disk clamp of claim 1, wherein the deflection portion is fashioned to deflect between about 140 μm and 280 μm when secured in an installed position.

10. The disk clamp of claim 1, wherein the deflection portion is fashioned to deflect between about 250 μm and 450 μm when secured in an installed position.

11. The disk clamp of claim 1, wherein the deflection portion is fashioned to deflect between about 500 μm and 900 μm when secured in an installed position.

12. The disk clamp of claim 1, wherein the disk contact portion further includes a second curvature oriented radially outboard from the first curvature, said second curvature characterized by a convex shape with a radius of curvature no greater than 10 mm.

13. The disk clamp of claim 1, wherein the disk contact portion and the deflection portion are a single part having material continuity, rather than an assembly of sub-parts.

14. A disk clamp for clamping an information storage disk to a rotating spindle in a disk drive, the disk clamp comprising:
   a means for exerting a force on the information storage disk, said force being nonlinearly related to a deflection of the disk clamp such that a spring rate of the disk clamp decreases with increasing deflection of the disk clamp.

15. The disk clamp of claim 14, wherein said force depends upon said deflection in a way that is characteristic of a Belleville spring.

* * * * *